Patented July 26, 1932

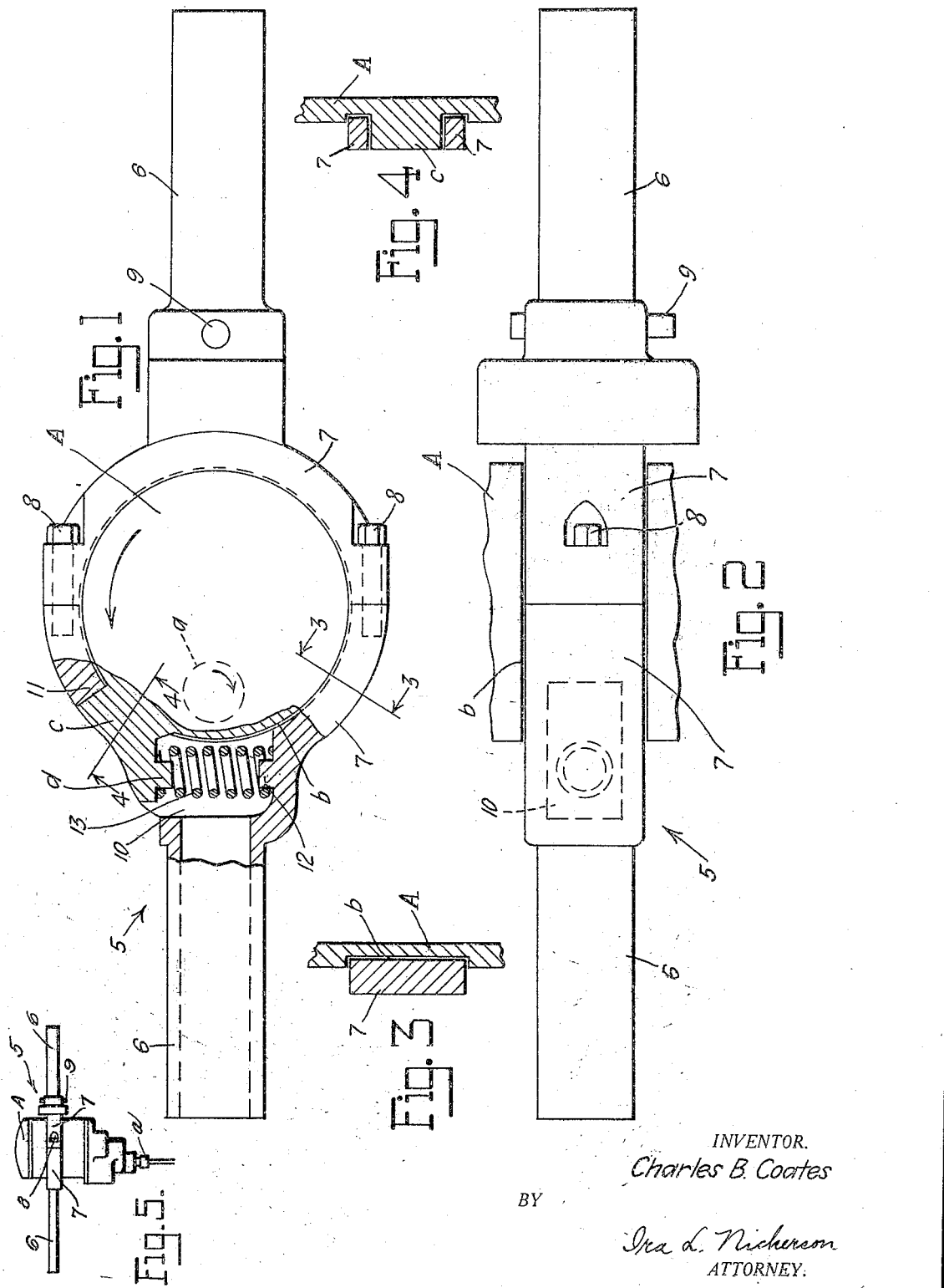

1,868,628

UNITED STATES PATENT OFFICE

CHARLES B. COATES, OF CLEVELAND, OHIO, ASSIGNOR TO CHICAGO PNEUMATIC TOOL COMPANY, OF NEW YORK, N. Y., A CORPORATION OF NEW JERSEY

POWER TOOL AND HANDLE THEREFOR

Application filed February 13, 1928. Serial No. 253,803.

This invention relates to power tools of the portable or hand operated type and particularly to the handles by which such tools are supported, more specifically it relates to handle attachments for power tools used for stud setting, nut running, screw driving and similar operations.

A principal object of the invention is to relieve the operator of such a tool of at least a part of the severe shock or recoil which he experiences when the securing member is driven home and the torque of the tool is transmitted back to the operator. Other objects will be apparent from the detailed description, which follows:

In order to illustrate the invention, one concrete embodiment thereof is shown in the accompanying drawing in which:

Fig. 1 is a plan view partly cut away showing a power tool with a handle attachment applied thereto:

Fig. 2 is a side elevational view of the parts shown in Fig. 1 with the tool casing broken away above and below the handle attachment:

Figs. 3 and 4 are detail sectional views on the lines 3—3 and 4—4, respectively, of Fig. 1: and Fig. 5 is a side elevational view of the power tool on a reduced scale.

The handle attachment is arranged to be conveniently applied to the casing of a portable tool operated by suitable power means such as a fluid pressure motor or an electric motor, particularly the latter. While the tool casing A may be of any desired contour it is shown as generally circular in form and has projecting therefrom a rotary spindle indicated diagrammatically at $a$ in Fig. 1. The handle attachment indicated generally at 5 (Figs. 1 and 2) provides a yoke conforming to the contour of motor casing A and enclosing the latter. To maintain the handle attachment 5 upon the motor in desired position these members have cooperating parts such as an annular groove $b$ in the casing into which the inner peripheral portion of the yoke extends (Fig. 3).

For ease of attachment or removal the handle attachment is preferably formed in a plurality of parts. In the present instance it is shown as having two parts each comprising a handle portion 6 and a base portion 7. The base portions fit the tool casing and form the yoke, the abutting ends of the bases being arranged to be secured together by a suitable engaging or clamping means such as screw bolts 8. One of the handles, such as the one shown at the right on the drawing, may carry the control means for the motor of tool A, such as a manually operable switch 9, if the motor is operated by electricity.

The handle attachment is further arranged to relieve the operator of the tool of at least a portion of the shock which results from the reaction of the tool when the spindle $a$ is suddenly stopped or retarded by the work. To this end the tool and the handle attachment are arranged for relative movement, cooperating stops on the casing A and handle attachment 5 limit the relative rotative movement of the same, and suitable means are provided for resisting such movement in one direction. A preferred arrangement for this purpose is illustrated in the drawing wherein motor casing A has a projection $c$ (Figs. 1 and 4) extending through or into a recess 10 in the base and handle portions of the handle attachment part shown at the left on the drawing. The extent of the recess 10 determines the amount of the permitted relative movement of casing A within the yoke of the handle attachment, the ends 11 and 12 of the recess forming stops to engage the opposing portions or stops of projection $c$ (Fig. 1). The resilient means for opposing relative movement of the parts are disposed within recess 10 and preferably take the form of a coil spring 13 engaging stop 12 on yoke 7 (which stop may be in the form of a boss) and also engaging a similar boss $d$ on projection $c$ of the casing. Spring 13 normally maintains projection $c$ in engagement with stop 11 of the yoke and yieldingly resists relative movement of casing A in the direction indicated by the large arrow when spindle $a$ is suddenly stopped, the direction of rotation of the spindle being indicated by the small arrow.

While a preferred form of the invention has been herein shown and described it is to be understood that the invention is not limited to the specific details thereof but covers all changes, modifications, and adaptations within the scope of the appended claims.

I claim as my invention:

1. A portable power tool having a rotatable spindle, a yoke encircling said tool and having projecting handles for manually supporting and controlling the same, a projection on said tool cooperating with a recess in said yoke for limiting the relative movement of said members, and resilient means within said recess and engaging said projection for resisting the reaction of said tool when its spindle is suddenly stopped or retarded by the work.

2. A portable power tool having a casing provided with an annular groove, a handle yoke encircling said casing and having a portion projecting within said groove to maintain said members in engagement, opposed handles extending radially from said yoke, a projection on said casing extending into a recess in said yoke, said projection and said yoke providing opposed pairs of stops for limiting the relative rotative movement of said casing and yoke, and resilient means engaging certain of said stops to resist rotative movement of said members in one direction.

3. In combination, a portable power tool having a casing provided with a reduced portion forming an annular groove, said casing having a stop projection extending from said reduced or grooved portion, a handle yoke encircling said casing and extending within said groove to maintain said yoke in place on said casing, tool supporting handles on said yoke and a recess in the latter receiving said casing projection, and resilient means housed in said yoke and engaging said casing projection to resist relative movement between said casing and said yoke in one direction.

4. In combination, a portable power tool having a casing provided with a reduced portion forming an annular groove, said casing having a stop projection extending from said reduced or grooved portion, arcuate parts secured together about said casing to form a handle yoke, said yoke extending into said groove in said casing, handles on each of said yoke parts, one of said parts providing a recess receiving said casing projectoin and providing opposed stops for the same, and a coil spring interposed between said projection and one of said stops yieldingly to resist movement of said tool casing relative to said handle yoke in one direction.

5. A manual supporting device for a portable power tool having an annular casing comprising handles having semicircular bases adapted to form an encircling yoke for the tool casing, and means for securing the engaging ends of said bases together, one of said bases having a recess providing a stop for limiting rotative movement of the tool casing within the yoke, and resilient means within said recess for resisting the permitted rotative movement of the casing.

Signed by me at Cleveland, in the county of Cuyahoga and State of Ohio this 8th day of February, 1928.

CHARLES B. COATES.